United States Patent
Chen et al.

(10) Patent No.: US 9,317,215 B2
(45) Date of Patent: Apr. 19, 2016

(54) MAPPING A SOURCE WORKLOAD PATTERN FOR A SOURCE STORAGE SYSTEM TO A TARGET WORKLOAD PATTERN FOR A TARGET STORAGE SYSTEM

(71) Applicant: GLOBALFOUNDRIES U.S. 2 LLC, Hopewell Junction, NY (US)

(72) Inventors: Chiahong Chen, Oro Valley, AZ (US); Lawrence Y. Chiu, Saratoga, CA (US); Nicolas M. Clayton, Warrington (GB); Shan Fan, Shanghai (CN); Yang Liu, Shanghai (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 323 days.

(21) Appl. No.: 13/901,495

(22) Filed: May 23, 2013

(65) Prior Publication Data

US 2014/0351537 A1    Nov. 27, 2014

(51) Int. Cl.
*G06F 12/00* (2006.01)
*G06F 3/06* (2006.01)
*G06F 11/14* (2006.01)

(52) U.S. Cl.
CPC .............. *G06F 3/065* (2013.01); *G06F 3/067* (2013.01); *G06F 3/0619* (2013.01); *G06F 11/1456* (2013.01)

(58) Field of Classification Search
CPC ..... G06F 3/0685; G06F 3/067; G06F 3/0649; G06F 11/3414; G06F 11/3485; G06F 3/0647
See application file for complete search history.

(56) References Cited

U.S. PATENT DOCUMENTS

| | | | |
|---|---|---|---|
| 8,239,584 B1 * | 8/2012 | Rabe et al. | 710/8 |
| 8,566,549 B1 * | 10/2013 | Burke et al. | 711/168 |
| 2004/0054850 A1 * | 3/2004 | Fisk | 711/112 |
| 2007/0088861 A1 | 4/2007 | Dudley et al. | |
| 2011/0010514 A1 * | 1/2011 | Benhase et al. | 711/162 |
| 2012/0124319 A1 * | 5/2012 | Kirvan et al. | 711/170 |
| 2012/0221521 A1 * | 8/2012 | Chiu et al. | 707/622 |
| 2012/0303929 A1 * | 11/2012 | Chiu et al. | 711/173 |

* cited by examiner

*Primary Examiner* — Brian Peugh
(74) *Attorney, Agent, or Firm* — David Cain; Hoffman Warnick LLC

(57) ABSTRACT

Provided are a method, system, and computer program product for mapping a source workload pattern for a source storage system to a target workload pattern for a target storage system. A source workload pattern is received from the source storage system having workload access characteristics of source logical addresses at the source storage system. The source workload pattern at the source logical addresses is mapped to a target workload pattern for target logical addresses at the target storage system. The target workload pattern for the target workload addresses is provided to the target storage system to use to determine storage locations in the target storage system to store received replicated data from the source logical addresses at the target logical addresses.

21 Claims, 6 Drawing Sheets

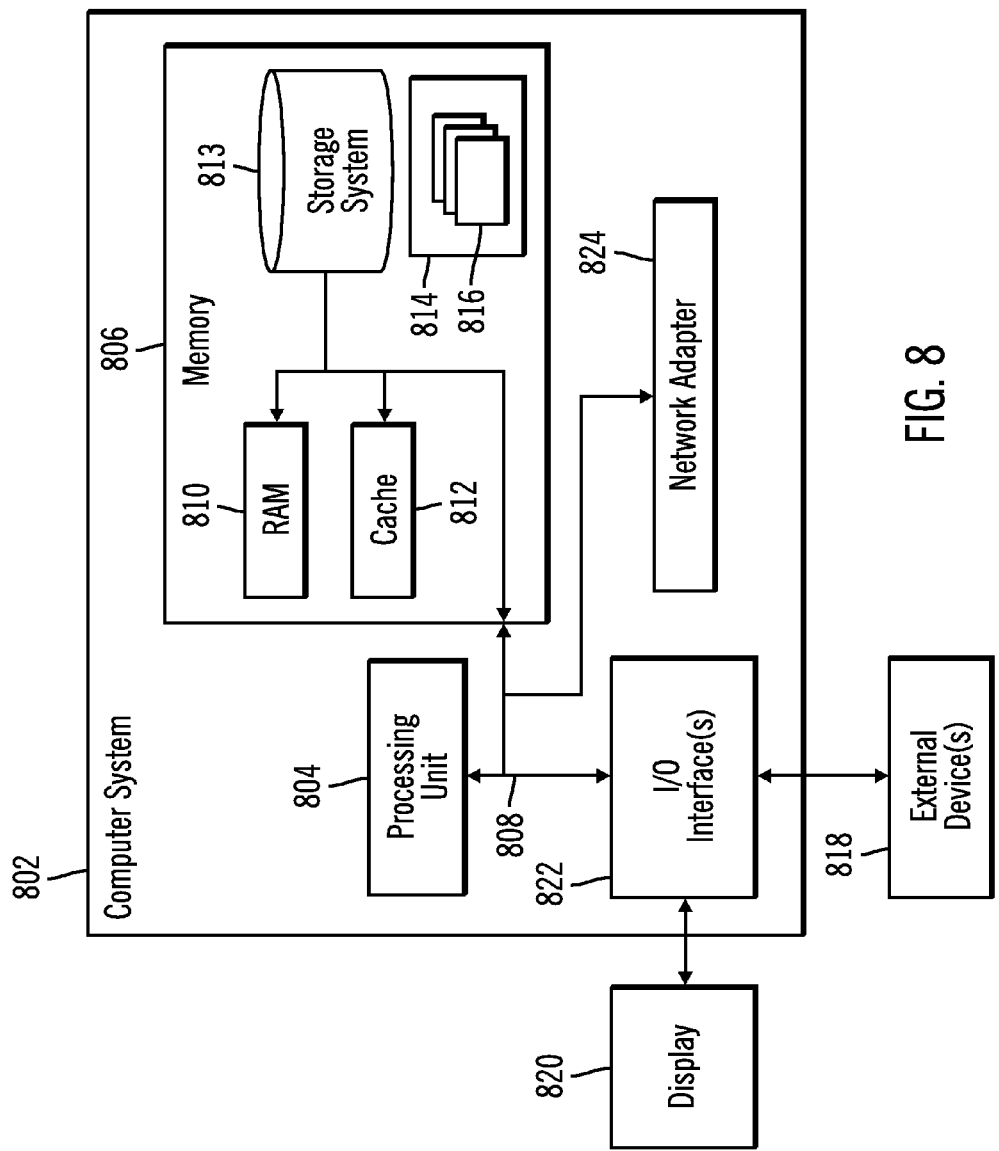

MAPPING A SOURCE WORKLOAD PATTERN FOR A SOURCE STORAGE SYSTEM TO A TARGET WORKLOAD PATTERN FOR A TARGET STORAGE SYSTEM

BACKGROUND OF THE INVENTION

1. Field of the Invention

The present invention relates to a method, system, and computer program product for mapping a source workload pattern for a source storage system to a target workload pattern for a target storage system.

2. Description of the Related Art

A Multi-tiered Storage System is a strategic networked storage method where data is stored on various types of storage devices primarily based on criteria of the access, frequency of use, security and data recovery requirements. For space and performance optimization, the data is transferred between high-cost and low-cost storage media. Such systems exist because high-speed storage devices, such as Solid State devices (SSD), Hard Disk Drive Arrays, etc., are more expensive (per byte stored) than the slower storage devices, such as optical discs and magnetic tape drives. While it would be ideal to have all data available on high-speed devices all the time, this is prohibitively expensive for many organizations. Instead, tiered systems store the bulk of the enterprise's data on slower devices, and then migrate more frequently accessed data to faster media when needed. The advantage is that the total amount of stored data can be much larger than the capacity of the active storage media available. In effect, tiered systems turn the fast storage devices into caches for the slower mass storage devices.

Storage tiering is the placement of data on different devices in the multi-tiered storage based on the type of usage, performance and capacity requirements of the data and the characteristics of the devices. Automated storage tiering programs automatically manage data placement by observing the characteristics of data in the multi-tiered storage and automatically moving the data among the different tiers of storage. Automated storage tiering decisions are based on observation of workloads or pre-set administrator policies which statically partition resources. To determine where to store data in a multi-tier storage system, a storage manager program will analyze data access patters, workloads on the storage devices, and usage of the devices and determine the tiers and devices within tiers on which to locate data.

SUMMARY

Provided are a method, system, and computer program product for mapping a source workload pattern for a source storage system to a target workload pattern for a target storage system. A source workload pattern is received from the source storage system having workload access characteristics of source logical addresses at the source storage system. The source workload pattern at the source logical addresses is mapped to a target workload pattern for target logical addresses at the target storage system. The target workload pattern for the target workload addresses is provided to the target storage system to use to determine storage locations in the target storage system to store received replicated data from the source logical addresses at the target logical addresses.

BRIEF DESCRIPTION OF THE DRAWINGS

FIG. 8 illustrates an embodiment of a computer architecture used with described embodiments.

DETAILED DESCRIPTION

In data replication environments, when data is replicated from the source storage system to the target storage systems the target storage systems may not have had sufficient time able to monitor and observe workload patterns to be able to develop an adequate target workload pattern to use for selecting optimal locations to store the replicated data in the target storage. This means the target storage system will not have had sufficient time to develop the knowledge needed to optimize the placement of the replicated data in a multi-tiered storage system.

Described embodiments address these problems and others by using a mapping to map a source workload pattern for source logical addresses to a target workload pattern for target logical addresses, so that the target logical addresses in the target workload pattern have the workload characteristics of the corresponding source logical addresses. This target workload pattern may be provided to the target storage systems before they receive the replicated data so that upon receiving the replicated data, the target storage systems will be able to optimize the placement of received replicated data within their multi-tiered storage system using the source workload characteristics indicated in the target workload pattern.

Figure 1:
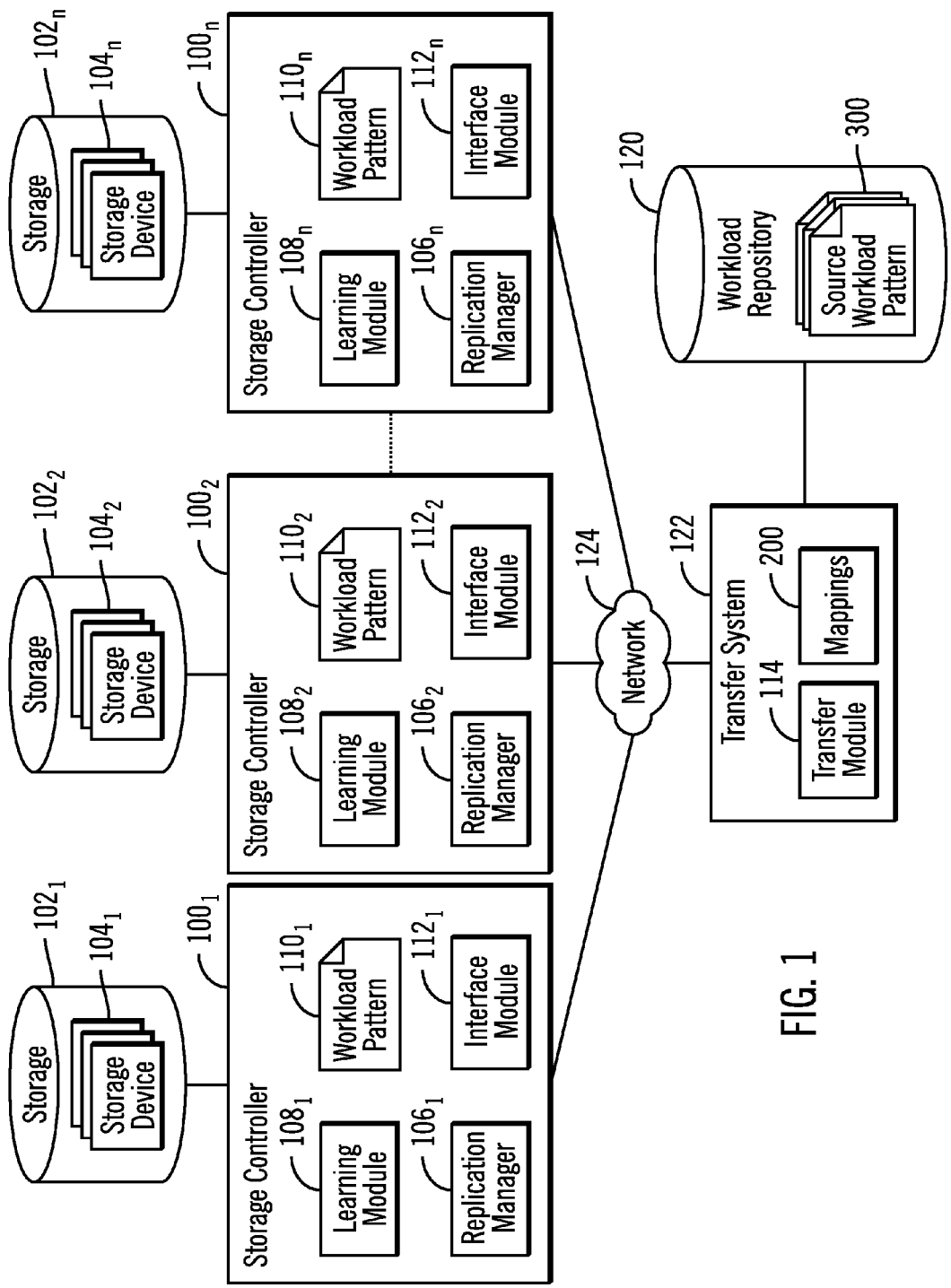
FIG. 1 illustrates an embodiment of a storage environment.

FIG. 1 illustrates a storage environment having a plurality of storage controllers $100_1$, $100_2$ ... $100_n$, each coupled to a storage $102_1$, $102_2$ ... $102_n$, to manage Input/Output (I/O) operations with respect to the respective coupled storage $102_1$, $102_2$ ... $102_n$. Each storage $102_1$, $102_2$ ... $102_n$ includes a plurality of storage devices $104_1$, $104_2$ ... $104_n$, which in certain embodiment may implement multiple tiers of storage devices, where each tier has storage attributes that differ from the storage attributes of other tiers. Different tiers may provide different storage attributes, such as quality of service, access speed, longevity of duration of storage, etc. The storage controllers $100_1$, $100_2$ ... $100_n$ each further include a replication manager $106_1$, $106_2$ ... $106_n$ to manage the replication of data among the storage controllers $100_1$, $100_2$ ... $100_n$. For instance, one storage controller, e.g., $100_1$, may operate as a source storage controller whose data in the coupled storage $102_1$ is replicated to the other storage controllers $100_2$ ... $100_n$ to store in their respective storages $102_2$ ... $102_n$. Any of the storage controllers $100_1$, $100_2$ ... $100_n$ may operate as the source and target. The combination of the storage controllers $100_1$, $100_2$ ... $100_n$ and their coupled storages $102_1$, $102_2$ ... $102_n$ are also referred to as a storage system providing the controller and storage media components.

The replication managers $106_1$, $106_2$ ... $106_n$ may maintain a mapping of source logical addresses to target logical addresses for each possible target storage controller $100_2$ ... $102_n$. These mappings are used to determine how to replicate the data Each storage controller further includes a learning module $108_1$, $108_2$ ... $108_n$ to monitor and determine workload characteristics for the logical addresses stored in the corresponding storage $102_1$, $102_2$ ... $102_n$. The learning modules $108_1, 108_2 \ldots 108_n$ may generate, import or export a workload pattern $110_1, 110_2 \ldots 110_n$ having the workload characteristics for logical addresses. The workload pattern $110_1, 110_2 \ldots 110_n$ comprises the I/O performance related characteristics of logical addresses or the storage units (e.g., logical blocks, extents, etc.), which describes the data access frequency (average/peak), latency (average/peak), throughput (average/peak), type of access (e.g., sequential, non-sequential, read, write, etc.), the trends prediction based on history, and the performance expectation. The workload pattern $110_1, 110_2 \ldots 110_n$ may be used to determine the strategy for dynamic storage unit reallocation among tiers or storage caching. The learning modules $108_1, 108_2 \ldots 108_n$ may generate the workload pattern $110_1, 110_2 \ldots 110_n$ from monitoring and learning against the I/O behavior on the storages $102_1, 102_2 \ldots 102_n$ for a period of time.

The storage controllers $100_1, 100_2 \ldots 100_n$ further include an interface module $112_1, 112_2 \ldots 112_n$ to interface with a transfer module 114 in a transfer system 122 to communicate the workload pattern $110_1, 110_2 \ldots 110_n$. In one embodiment, the source learning module $108_1$ may generate a source workload pattern $110_1$ by monitoring and learning from the I/O behavior to the source logical addresses in the source storage $102_1$ and transmit to the transfer module 114 via the interface module $112_1$ the determined workload pattern $110_1$. The transfer module 114 may then generate target workload patterns, e.g., $110_2 \ldots 110_n$ using the source workload pattern $110_1$ and the mappings 200 of source logical addresses to target logical addresses. The transfer module 114 communicates the generated target workload patterns $110_2 \ldots 110_n$ to the target interface modules $112_2 \ldots 112_n$ for use in the target storage controllers $100_2 \ldots 100_n$ to determine where to store, e.g., the particular storage tier, the replicated source data from the source storage controller $100_1$.

The transfer module 114 may store received source workload patterns $110_1$ as workload patterns 300 in a workload repository 120, which may comprise a non-volatile storage system.

In one embodiment, the transfer module 114 may be implemented in a transfer system 122 separate from the storage controllers $100_1, 100_2 \ldots 100_n$, where the transfer system 122 and storage controllers $100_1, 100_2 \ldots 100_n$ may communicate over a network 124. In an alternative embodiment, the transfer module 114 may be implemented as a component in one or more of the storage controllers $100_1, 100_2 \ldots 100_n$. The network 124 may comprise a Storage Area Network (SAN), Wide Area Network (WAN), Local Area Network (LAN), the Internet, and Intranet, a wireless network, wired network, etc.

In certain embodiments, the transfer module 114 and interface modules $112_2 \ldots 112_n$ may transfer workload patterns $110_1, 110_2 \ldots 110_n$ independently and out-of-band with respect to the replication operations handled by the replication managers $106_1, 106_2 \ldots 106_n$, so that the workload patterns may be received in advance of the target controllers receiving replicated data. The target storage controllers $100_2 \ldots 100_n$, may use the workload patterns to determine the placement of received replicated source data in the appropriate storage tier or storage devices $104_1, 104_2 \ldots 104_n$.

The learning modules $108_1, 108_2 \ldots 108_n$ may monitor the real workload and generate the workload pattern through learning, and may export the workload pattern for the specified storage units into a workload pattern file $110_1, 110_2 \ldots 110_n$, which can be transferred to other storage controller $100_1, 100_2 \ldots 100_n$. The learning module $108_1, 108_2 \ldots 108_n$ may import the workload pattern from a workload pattern file from the work repository 120 or another storage controller with or without a storage unit mapping file. The import will cause the current workload pattern $110_1, 110_2 \ldots 110_n$ to be overwritten by the imported workload pattern, or merged with the imported workload pattern, such as by averaging or combining workload characteristic results.

The storage controller mapping files 200 may be generated by software that manages copy services relationship, data migration services or the life cycle of a periodical workload, such as the replication manager $106_1, 106_2 \ldots 106_n$. With the storage mappings 200, the workload pattern generated at one storage controller $100_1, 100_2 \ldots 100_n$ can be imported and used for storage controllers $100_1, 100_2 \ldots 100_n$ and their storages $104_1, 104_2 \ldots 104_n$, such as storage devices of a different logical device on the same storage controller.

The variable "n" used herein to denote a number of elements may denote any integer number of elements.

Figure 2:
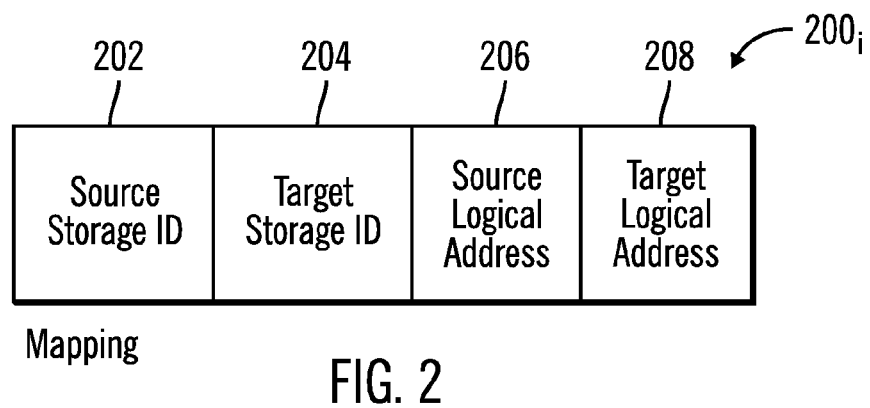
FIG. 2 illustrates an embodiment of a storage mapping.

FIG. 2 illustrates an embodiment of an instance of a mapping 200, of the mappings 300 for one of the target storage controllers $100_2 \ldots 100_n$, including a source storage identifier (ID) 202 indicating the source storage $100_1$ and a target storage ID 204 indicating the target storage $102_2 \ldots 102_n$, and the source logical addresses 206 that map to corresponding target logical addresses 208 in the target storage 204. The mapping 200 may be obtained from the replication program $106_1$ or other copy manager that is managing the copying of source data to the target data.

Figure 3:
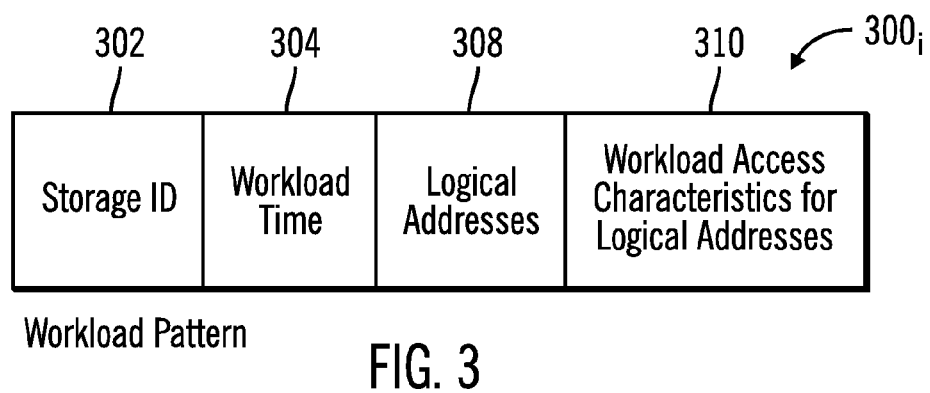
FIG. 3 illustrates an embodiment of a workload pattern.

FIG. 3 illustrates an embodiment of an instance of a workload pattern $300_i$, such as one of the source workload patterns $110_1$, 300 stored in the repository 120 and a target workload pattern $110_2 \ldots 110_n$, including a storage ID 302 of the storage from which the workload pattern was generated, e.g., $100_1$, a workload time 304 the workload pattern was generated; logical addresses 308 for which workload information is maintained and workload characteristics 310 for the logical addresses, where each logical address may have separate workload characteristics or 310 workload characteristics may apply to multiple logical address. A logical address may comprise a logical block address (LBA), extent, or other logical unit of storage that maps to physical locations.

The storage devices $104_1, 104_2, \ldots 104_n$ may comprise different types or classes of storage devices, such as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storage devices $104_1, 104_2 \ldots 104_n$ may further be configured into an array of devices, such as Just a Bunch of Disks (JBOD), Direct Access Storage Device (DASD), Redundant Array of Independent Disks (RAID) array, virtualization device, etc. Further, the storage devices $104_1, 104_2, \ldots 104_n$ may comprise heterogeneous storage devices from different vendors.

The storage devices $104_1, 104_2, \ldots 104_n$ may be grouped into multiple tiers based on their performance with respect to data access, where each tier has a class of slower access devices than a previous tier in the hierarchy of tiers. The arrangement of storage tiers in the storage devices $104_1, 104_2 \ldots 104_n$ may be based on characteristics such as speed of their Input/Output (I/O) access profile, redundancy, etc. In one embodiment, the first tier may comprise memory, second tier solid state storage devices (SSD), third tier hard disk drive (HDDs), and fourth tier an archival storage medium, such as tape, optical disk or slower access hard disk drives. The storage controllers $100_1, 100_2 \ldots 100_n$ would include a storage manager to manage the storage of data in the storage tiers $102_1, 102_2, \ldots 102_n$ and migrate data between the storage tiers $102_1, 102_2, \ldots 102_n$ based on data management criteria, such as used in a multi-tiered storage system or hierarchical storage management system (HSM). The storage controller $100_1, 100_2 \ldots 100_n$ may manage the transfer of data and objects between tiers based upon data management criteria, such as used in a multi-tiered storage system or hierarchical storage management system (HSM).

Figure 4:
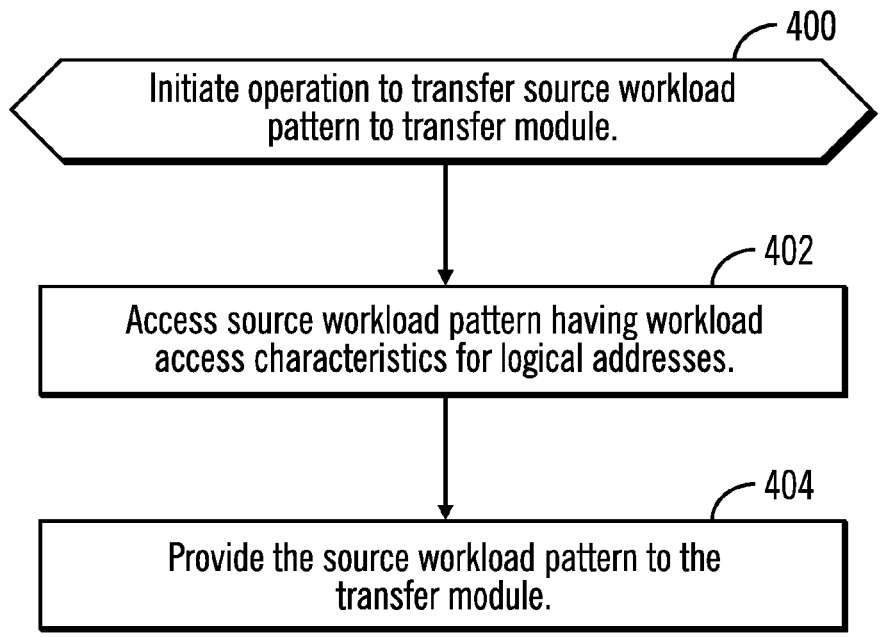
FIG. 4 illustrates an embodiment of operations to transfer a source workload pattern.

FIG. 4 illustrates an embodiment of operations performed by components in the storage controller $100_1, 100_2 \ldots 100n$, such as the learning modules $108_1, 108_2 \ldots 108_n$, to provide workflow pattern files $110_1, 110_2 \ldots 110_n$. Upon initiating (at block 400) an operation to transfer the source workload pattern $110_1$ to the transfer module 114, the learning module $108_1$ accesses (at block 402) the current source workload pattern file $110_1$ having workload access characteristics for source logical addresses. The interface module $112_1$ provides (at block 404) the source workload pattern $110_1$ to the transfer module 114. In one embodiment, the learning module $108_1$ may periodically transfer a current source workload pattern $110_1$ to the transfer module 114 to store in the workload repository 120. Alternatively, the transfer module 114 may periodically fetch the source workload pattern $110_1$ from the storage controller $100_1$.

Figure 5:
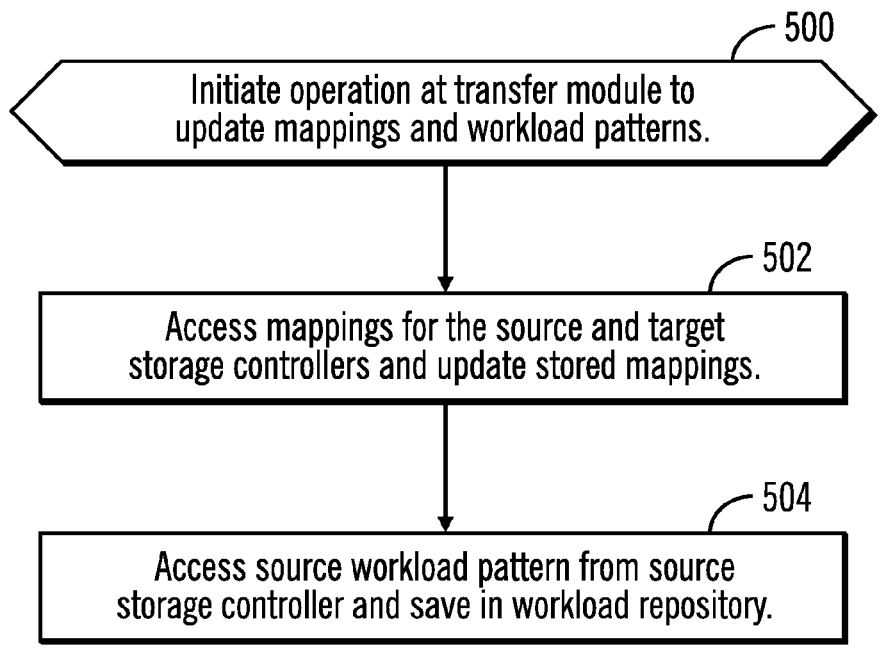
FIG. 5 illustrates an embodiment of operations to update storage mappings and workload patterns.

FIG. 5 illustrates an embodiment of operations performed by the transfer module 114 to provide the target storage controllers $100_2 \ldots 100_n$ a previous or current workload pattern file 300 from the workload repository 120. Upon initiating (at block 500) an operation at the transfer module 114 to update the mappings 200 and workload patterns 300, the transfer module 114 accesses (at block 502) mappings for the source and target storage controllers $100_1, 100_2 \ldots 100n$ and updates the stored mappings 200. The transfer module 114 accesses (at block 504) the source workload pattern $110_1$ from the source storage controller $100_1$ and saves in the workload repository 120.

In one embodiment, the transfer module 114 may periodically fetch the mapping files 200 from the replication managers $106_1, 106_2 \ldots 106_n$ or other copy management software, such software managing a copy services relationship or data migration service for the source and target storage controllers $100_1, 100_2 \ldots 100n$ (e.g., Total Productivity Center for Replication (TPC-R), Geographically Dispersed Parallel Sysplex (GDPS), and Transparent Data Migration Facility (TDMF)). The transfer module 114 may further access the source workload pattern $110_1$ from the source learning module $108_1$. In alternative embodiments, the source storage controller $100_1$ may push the workload pattern $110_1$ and mappings 200 to the transfer module 114.

Figure 6:
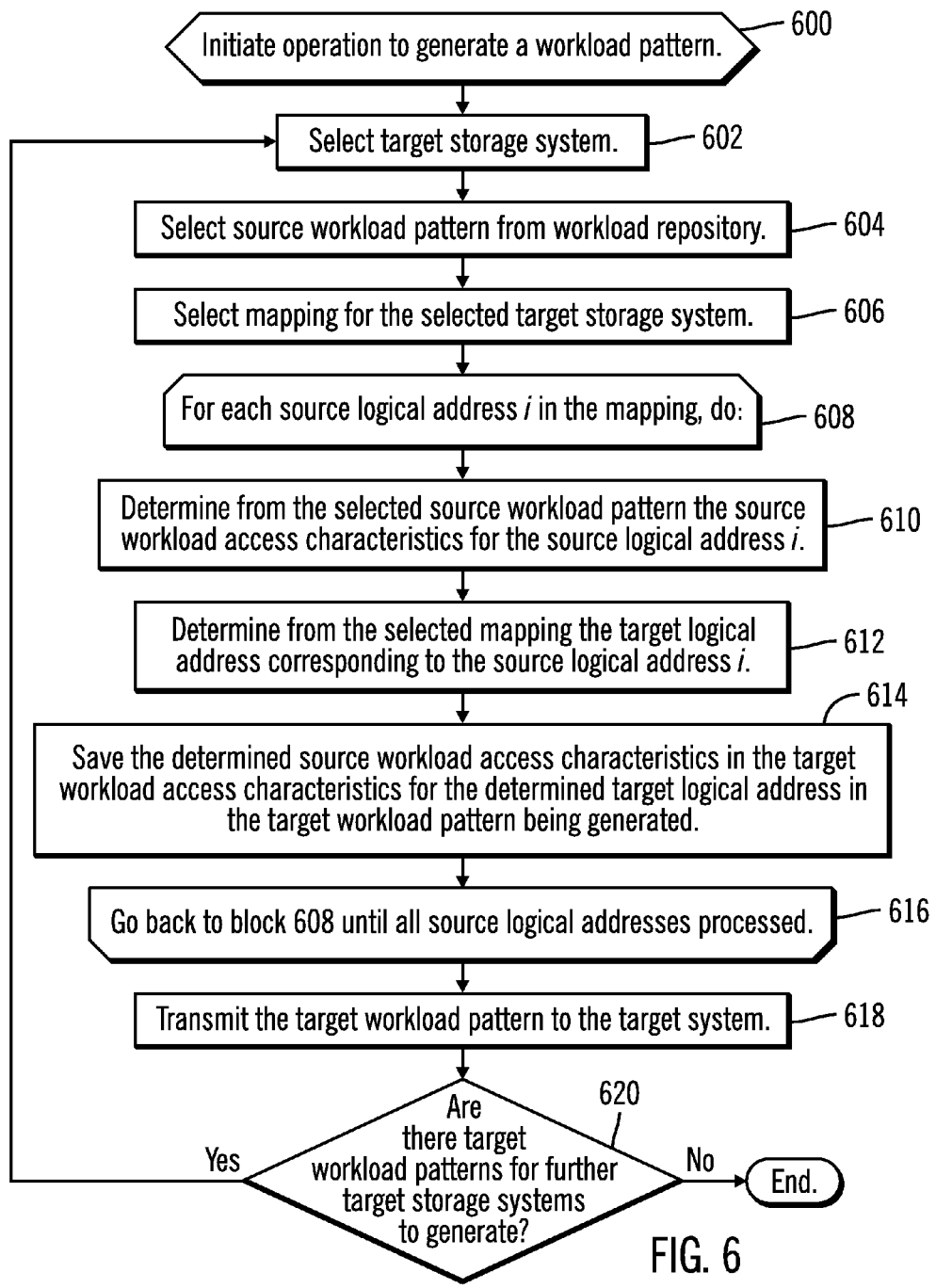
FIGS. 6 and 7 illustrate embodiments of operations to generate a workload pattern

FIG. 6 illustrates an embodiment of operations performed by the transfer module 114 to generate a target workload pattern $110_2 \ldots 110_n$ to send to one or more of the target storage controllers $100_2 \ldots 100_n$. Upon initiating (at block 600) an operation to generate a workload pattern, the transfer module 114 selects (at block 602) a target storage system $100_2 \ldots 100_n$ and selects (at block 606) a source workload pattern 300 from the workload repository. The target storage system may be selected based on a factor, such as one selected to provide a regularly scheduled workload pattern update. The transfer module 114 further selects (at block 608) the mapping 200 to use for the selected target storage controller $100_2 \ldots 100_n$.

The selected source workload pattern 300 may comprise a most recent source workload pattern 300 or a historical source workload pattern 300 if the historical workload pattern is determined to be more relevant to the current data being replicated from the source storage controller $100_1$. Further, the transfer module 114 or user may select a source workload pattern 300 that is most relevant for the anticipated replication to the target system likely to occur.

The transfer module 114 performs a loop of operations at blocks 608 through 616 for each source logical address i indicated in the selected mapping 200. The transfer module 114 determines (at block 610) from the selected source workload pattern 300 the source workload access characteristics 310 for the source logical address i and determines (at block 612) from the selected mapping 300 the target logical address 208 corresponding to the source logical address i 206 (FIG. 2). The determined source workload access characteristics 310 are saved (at block 614) in the target workload access characteristics 310 for the determined target logical address in the target workload pattern $110_2 \ldots 110_n$ being generated. After populating the target workload access characteristics 310 for all the target logical addresses 308, the generated target workload pattern $110_2 \ldots 110_n$ is transmitted to the target storage controller $100_2 \ldots 100_n$ (target system). The generated workload pattern $110_2 \ldots 110_n$ may be provided via the interface module $112_2 \ldots 112_n$ to the target learning module $108_2 \ldots 108_n$ to use. If (at block 620) there are further target workload patterns $110_2 \ldots 110_n$ to generate, then control proceeds back to block 602 to generate the workload pattern for a further target storage controller $100_2 \ldots 100_n$. Otherwise, if there are no further target workload patterns to generate, then control ends.

Figure 7:
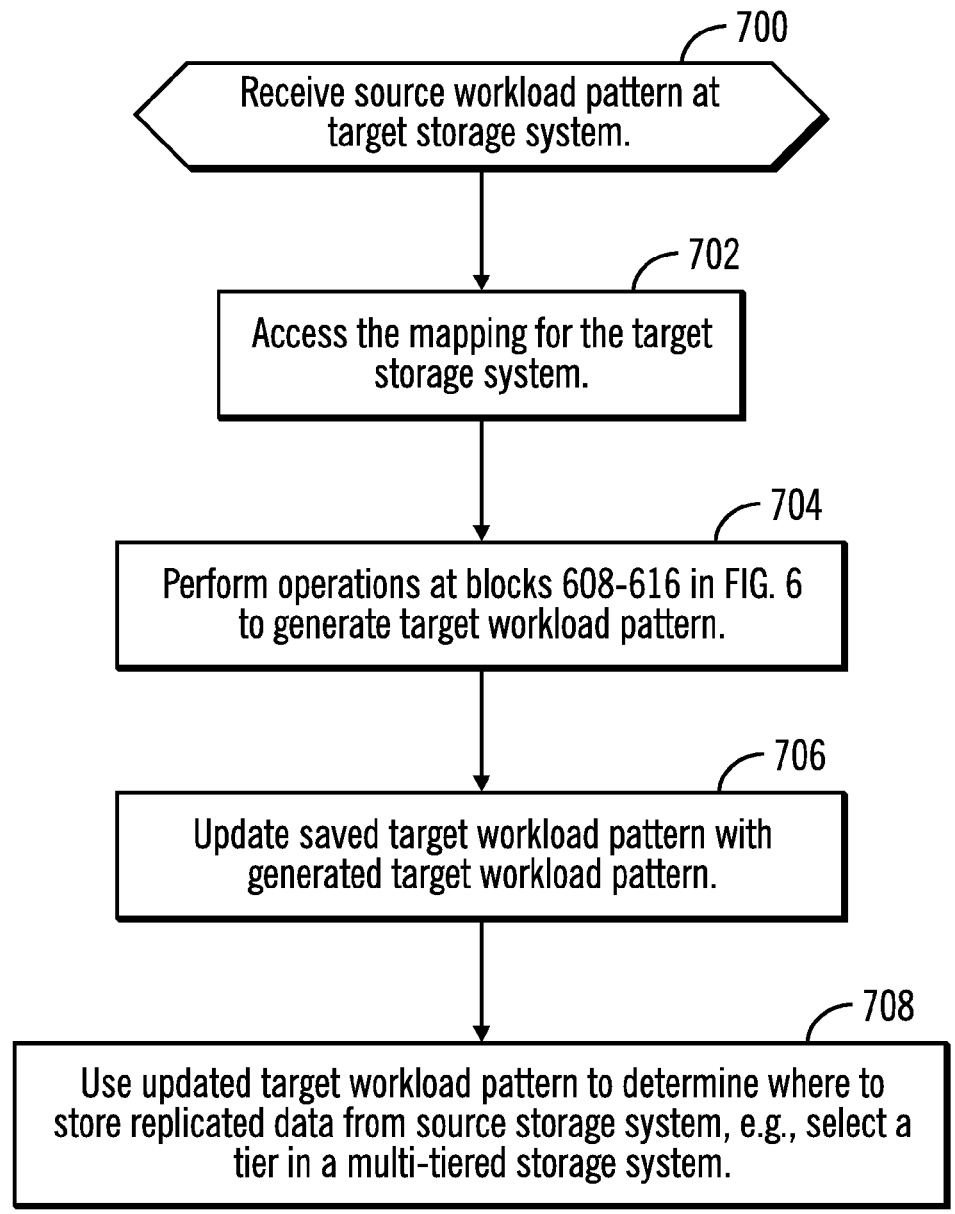

FIG. 7 illustrates an alternative embodiment of operations of the components in the target storage controllers $100_2 \ldots 100_n$, such as the interface module $112_2 \ldots 112$ and the learning module $108_2 \ldots 108_n$ to generate target workload patterns $110_2 \ldots 110_n$ to use to determine the placement of replicated data in the target storage systems $102_2 \ldots 102_m$. In this embodiment, the transfer module 114 may provide the target storage controller $102_2 \ldots 102_n$ the mapping 200 for that target storage controller $102_2 \ldots 102_n$ and the source workload pattern 300 to use to generate the target workload patterns $110_2 \ldots 110_n$. Upon the target storage controller $100_2 \ldots 100_n$ receiving (at block 700) a source workload pattern 300 from the transfer module 114, the learning module $108_2 \ldots 108_n$ or other component access the mapping for that target system $100_2 \ldots 100_n$. The learning module $108_2 \ldots 108_n$ then performs the operations at blocks 608-616 in FIG. 6 to generate the target workload pattern and updates (at block 706) the saved target workload pattern $110_2 \ldots 110_n$ being used at the target system with the newly generated target workload pattern. The learning module $108_2 \ldots 108_n$ then subsequently uses (at block 708) the updated target workload pattern $110_2 \ldots 110_n$ to determine where to store replicated data received from the source storage system $100_1$, e.g., select a tier in a multi-tiered storage system.

In one embodiment, the target workload pattern may be updated by replacing the target workload pattern $110_2 \ldots 110_n$ with the newly generated target workload pattern. Alternatively, the learning module $108_2 \ldots 108_n$ may merge previous target workload pattern values with the new generated target workload pattern by combining information to merge past trends with current.

Described embodiments provide techniques to capture a source storage system workload pattern from which data is being replicated to target storage systems. Saved source workload patterns may be used with mapping information indicating a correspondence of source logical addresses and target logical addresses to generate a new target workload pattern based on current workload access characteristics of the source workload pattern. Thus, the source data replicated to the target storage systems will be managed in a manner similar to how managed at the source storage system because the source workload pattern is used to determine management of the replicated source data at the target storage systems.

Further, in certain embodiments, the target workload pattern is provided and available at the time the replicated source data is received so that the generated target workload pattern may be used to place the received replicated source data in the target storage system.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The storage controllers $100_1$, $100_2$ ... $100_n$ and transfer system 122, and components therein, may be implemented in one or more computer systems, such as the computer system 802 shown in FIG. 8. If the components of the network computing environment of FIG. 1 are implemented in multiple systems, then the systems may communicate over the network 124. Computer system/server 802 may be described in the general context of computer system executable instructions, such as program modules, being executed by a computer system. Generally, program modules may include routines, programs, objects, components, logic, data structures, and so on that perform particular resources or implement particular abstract data types. Computer system/server 802 may be practiced in distributed cloud computing environments where resources are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 816 which generally carry out the functions and/or methodologies of embodiments of the invention as described herein.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing storage of data between a source storage system and a target storage system, the computer program product comprising a computer readable storage medium having computer readable program code embodied therein that executes to perform operations, the operations comprising:

receiving a source workload pattern from the source storage system having workload access characteristics of source logical addresses at the source storage system;

determining for the source logical addresses source workload access characteristics from the source workload pattern;

determining the target logical addresses corresponding to the source logical addresses for which the source workload access characteristics were determined;

mapping the determined source workload access characteristics for the source logical addresses to a target workload pattern for the determined target logical addresses at the target storage system corresponding to the source logical addresses; and providing the target workload pattern for the target logical addresses to the target storage system to use to determine storage locations in the target storage system to store received replicated data from the source logical addresses at the target logical addresses.

2. The computer program product of claim 1, wherein the target storage system stores the target workload pattern to use to determine the target storage locations to store replicated source storage logical in response to receiving the replicated source storage logical addresses.

3. The computer program product of claim 1, wherein the source storage system has tiers of different types of storage devices having different access characteristics, wherein the source workload pattern is used to determine storage locations in the tiers to store data at the source logical addresses, and wherein the target storage system has tiers of different types of target storage devices having different access characteristics, wherein the target workload pattern is used to determine storage locations in the tiers in the target storage system to store the data from the source logical addresses.

4. The computer program product of claim 1, wherein there are a plurality of target storage systems to which the data at the source logical addresses is replicated, wherein the operation further comprise:

maintaining a mapping for each of the target storage systems mapping the source logical addresses to the target logical addresses, wherein the mapping for each of the target storage systems is used to map the source workload pattern to the target workload pattern, wherein each of the target systems uses the target workload pattern generated for the target storage system to store replicated data.

5. The computer program product of claim 4, wherein a transfer module performs the mapping of the source workload pattern to the target workload pattern for the target storage systems, further comprising:

transmitting, by the transfer module, the target workload patterns to the target storage systems for which the target workload pattern was generated.

6. The computer program product of claim 1, wherein the operations further comprise:

transmitting the source workload pattern and a mapping of the source logical addresses to the target logical addresses to the target storage system, wherein the target storage system performs the mapping of the source workload pattern to the target workload pattern and provides the target workload pattern to use.

7. The computer program product of claim 1, wherein the operations further comprise:

maintaining multiple source workload patterns having different source workload patterns for the source logical addresses taken at different times in a workload pattern repository; and selecting from the workload pattern repository one of the source workload patterns, wherein the mapped source workload pattern comprises the selected source workload pattern.

8. The computer program product of claim 7, wherein the operations further comprise:

selecting one of the source workload patterns from the repository; and providing the selected source workload pattern to the source storage system to use to determine storage locations in the source storage system to store the data for the source logical addresses.

9. The computer program product of claim 1, wherein the operations further comprise:

maintaining a mapping for the target storage system mapping the source logical addresses to the target logical addresses;

receiving on multiple occasions a current version of the mapping from the target storage system;

updating the mapping for the target storage system with the received current version of the mapping; and receiving from the source storage system updated source workload patterns, wherein the mapping to generate the target workload pattern is periodically performed to periodically provide the target storage system an updated target workload pattern using the updated mapping.

10. A system for managing storage of data between a source storage system and a target storage system, comprising:

a processor;

a computer readable storage medium comprising computer readable code executed by the processor to perform operations, the operations comprising:

receiving a source workload pattern from the source storage system having workload access characteristics of source logical addresses at the source storage system;

determining for the source logical addresses source workload access characteristics from the source workload pattern;

determining the target logical addresses corresponding to the source logical addresses for which the source workload access characteristics were determined;

mapping the determined source workload access characteristics for the source logical addresses to a target workload pattern for the determined target logical addresses at the target storage system; and providing the target workload pattern for the target logical addresses to the target storage system to use to determine storage locations in the target storage system to store received replicated data from the source logical addresses at the target logical addresses.

11. The system of claim 10, wherein the target storage system stores the target workload pattern to use to determine the target storage locations to store replicated source storage logical in response to receiving the replicated source storage logical addresses.

12. The system of claim 10, wherein the source storage system has tiers of different types of storage devices having different access characteristics, wherein the source workload pattern is used to determine storage locations in the tiers to store data at the source logical addresses, and wherein the target storage system has tiers of different types of target storage devices having different access characteristics, wherein the target workload pattern is used to determine storage locations in the tiers in the target storage system to store the data from the source logical addresses.

13. The system of claim 10, wherein there are a plurality of target storage systems to which the data at the source logical addresses is replicated, wherein the operation further comprise:

maintaining a mapping for each of the target storage systems mapping the source logical addresses to the target logical addresses, wherein the mapping for each of the target storage systems is used to map the source workload pattern to the target workload pattern, wherein each of the target systems uses the target workload pattern generated for the target storage system to store replicated data.

14. The system of claim 10, wherein the operations further comprise:

transmitting the source workload pattern and a mapping of the source logical addresses to the target logical addresses to the target storage system, wherein the target storage system performs the mapping of the source workload pattern to the target workload pattern and provides the target workload pattern to use.

15. The system of claim 10, wherein the operations further comprise:

maintaining multiple source workload patterns having different source workload patterns for the source logical addresses taken at different times in a workload pattern repository; and selecting from the workload pattern repository one of the source workload patterns, wherein the mapped source workload pattern comprises the selected source workload pattern.

16. A method for managing storage of data between a source storage system and a target storage system, comprising:

receiving a source workload pattern from the source storage system having workload access characteristics of source logical addresses at the source storage system;

determining for the source logical addresses source workload access characteristics from the source workload pattern;

determining the target logical addresses corresponding to the source logical addresses for which the source workload access characteristics were determined;

mapping the determined source workload access characteristics for the source logical addresses to a target workload pattern for the determined target logical addresses at the target storage system; and providing the target workload pattern for the target logical addresses to the target storage system to use to determine storage locations in the target storage system to store received replicated data from the source logical addresses at the target logical addresses.

17. The method of claim 16, wherein the target storage system stores the target workload pattern to use to determine the target storage locations to store replicated source storage logical in response to receiving the replicated source storage logical addresses.

18. The method of claim 16, wherein the source storage system has tiers of different types of storage devices having different access characteristics, wherein the source workload pattern is used to determine storage locations in the tiers to store data at the source logical addresses, and wherein the target storage system has tiers of different types of target storage devices having different access characteristics, wherein the target workload pattern is used to determine storage locations in the tiers in the target storage system to store the data from the source logical addresses.

19. The method of claim 16, wherein there are a plurality of target storage systems to which the data at the source logical addresses is replicated, further comprising:

maintaining a mapping for each of the target storage systems mapping the source logical addresses to the target logical addresses, wherein the mapping for each of the target storage systems is used to map the source workload pattern to the target workload pattern, wherein each of the target systems uses the target workload pattern generated for the target storage system to store replicated data.

20. The method of claim 16, further comprising:

transmitting the source workload pattern and a mapping of the source logical addresses to the target logical addresses to the target storage system, wherein the target storage system performs the mapping of the source workload pattern to the target workload pattern and provides the target workload pattern to use.

21. The method of claim 16, further comprising:

maintaining multiple source workload patterns having different source workload patterns for the source logical addresses taken at different times in a workload pattern repository; and selecting from the workload pattern repository one of the source workload patterns, wherein the mapped source workload pattern comprises the selected source workload pattern.

* * * * *